Figure 1:
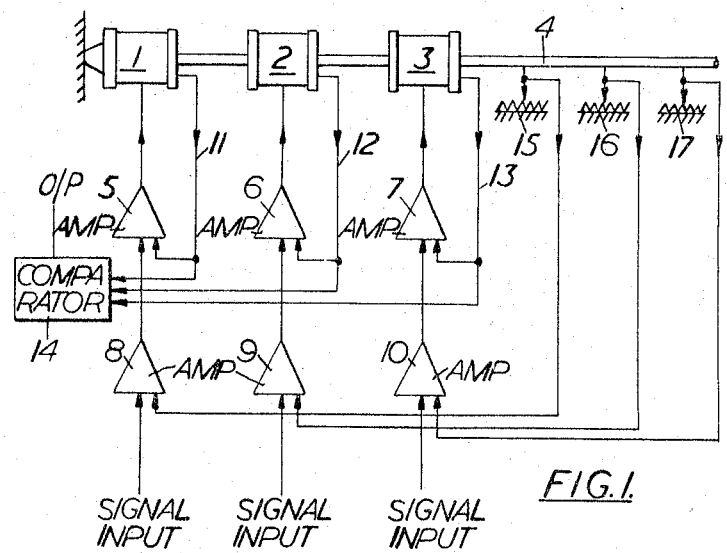

March 14, 1967  D. J. MARTIN ET AL  3,309,588
MULTIPLEX SERVO SYSTEM FOR SERVO MOTORS
MECHANICALLY CONNECTED IN SERIES
Filed Dec. 5, 1963  2 Sheets-Sheet 1

Inventors
M.C. CURTIES
D.J. MARTIN
By
Cameron, Kerkam + Sutton
Attorneys

United States Patent Office 3,309,588
Patented Mar. 14, 1967

3,309,588
MULTIPLEX SERVO SYSTEM FOR SERVO MOTORS MECHANICALLY CONNECTED IN SERIES
Derek John Martin, Spondon Village, near Derby, and Maurice Cecil Curties, Lightwater, Surrey, England, assignors to Ferranti, Limited, Hollinwood, England, a company of the United Kingdom of Great Britain and Northern Ireland
Filed Dec. 5, 1963, Ser. No. 328,231
8 Claims. (Cl. 318—19)

This invention relates to multiplex servo systems.

Multiplex servo systems are known which include a plurality of servo motors mechanically connected in parallel for driving an output member, each servo motor being controlled through an individual sub-channel including one or more amplifiers. For such systems to operate satisfactorily it is necessary for the sub-channel gains to be matched and this necessitates either accurate manufacture of each individual amplifier or the use of gain matching circuits. Furthermore, since the output displacements of all the servo motors are usually constrained to be the same, even in the event of appreciable gain differences, due to the parallel connection, the use of simple output displacement monitoring to compare the outputs of the separate servo motors is not possible and use must be made of torque or force comparators.

It is an object of the present invention to provide a multiplex servo system in which matching of the sub-channel gains is not required and which, in the event of any individual sub-channel failure, will continue to operate satisfactorily without the need to disconnect the failed sub-channel by the use of monitoring devices and without any manual participation. Simple output displacement monitoring may be utilised to identify the failed sub-channel if identification is required.

According to the present invention a multiplex servo system includes a plurality of servo motors mechanically connected in series for driving an output member, each servo motor being controlled through an individual sub-channel having at least one amplifier, each sub-channel including a negative feedback path from the associated servo motor and a negative feedback path from an individual pick-off device responsive to movement of said output member.

Each of said sub-channels may include a servo amplifier and a signal amplifier in which case the negative feedback path from the associated servo motor may be connected to said servo amplifier and the negative feedback path from said individual pick-off device may be connected to said signal amplifier.

The negative feedback path from each servo motor may be multiplexed. Similarly, said individual pick-off devices and the negative feedback paths therefrom may be multiplexed.

The system may further include a comparison device for comparing the output displacements of each of said servo motors and said comparison device may comprise an electrical comparator connected to a negative feedback path from each servo motor. Alternatively a mechanical device measuring the servo outputs directly may be employed.

Figure 2:
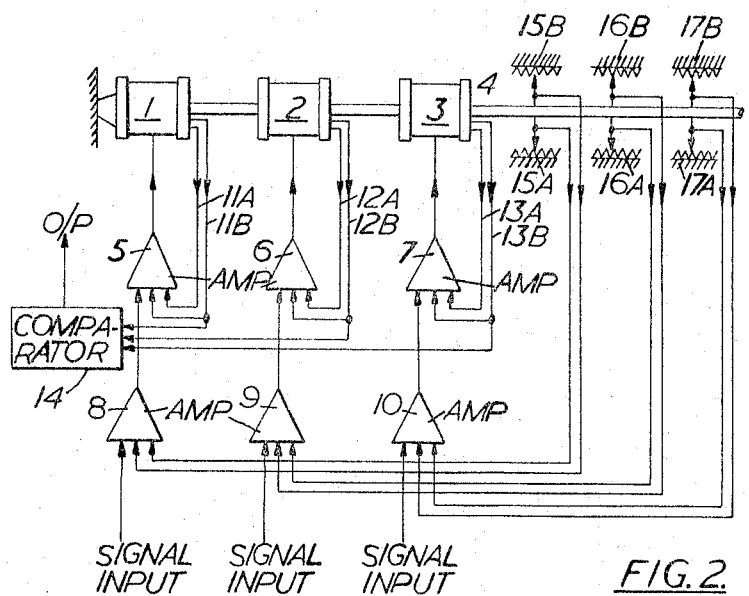
Figure 3:
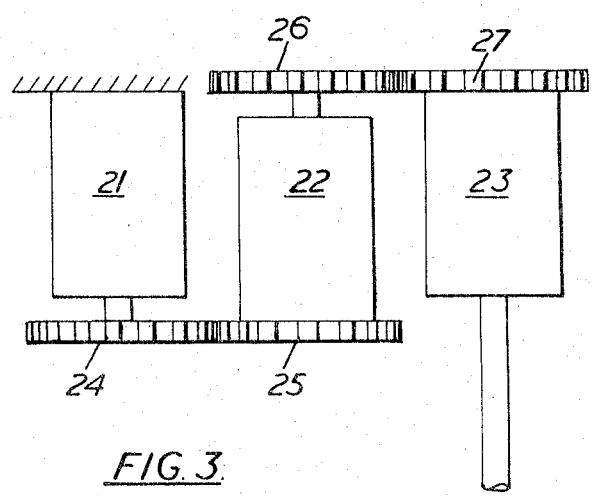

The present invention will now be described by way of example with reference to the accompanying drawings in which:

FIGURE 1 is a schematic diagram showing a triplex servo system in accordance with the invention, FIGURE 2 is a schematic diagram showing a modification of the system shown in FIGURE 1, and FIGURE 3 is a plan view of three servo system motors mechanically connected in series for giving a rotary output.

Referring now to FIGURE 1 of the drawings there is shown a triplex servo system forming part of an aircraft autopilot. The system includes three servo motors 1, 2, 3 mechanically connected in series for driving an output member 4 in a straight line manner, the casing of the servo-motor 1 being secured to the framework of the aircraft. The servo motors 1, 2, 3 are controlled through individual sub-channels comprising servo amplifiers 5, 6, 7 and signal amplifiers 8, 9, 10 respectively, the signal inputs to the signal amplifiers 8, 9, 10 being derived from similar, but separate, sources. Negative feedback paths 11, 12, 13 are provided between the servo motors 1, 2, 3 and the servo amplifiers 5, 6, 7 respectively in known manner, a comparator 14 being connected to the paths 11, 12, 13 for comparing the amplitude of the signals fed back to the servo amplifiers 5, 6, 7.

Three similar pick-off devices 15, 16, 17, shown schematically as potentiometers, are provided for detecting movements of the output member 4 and the outputs of the pick-off devices 15, 16, 17 are applied as a negative feedback to the signal amplifiers 8, 9, 10 respectively.

Each of the servo motors 1, 2, 3 is given full authority, that is to say, each of the servo motors 1, 2, 3 is able to provide up to the total movement of the output member 4.

During normal operation of the system the individual displacements caused by the servo motors 1, 2, 3 are added to cause the displacement of the output member 4 so that with all three sub-channels functioning correctly the output travel is shared between the three servo motors 1, 2, 3. Due to the provision of three separate negative feedback signals derived from the three pick-off devices 15, 16, 17 any error introduced by one sub-channel is corrected by the other two sub-channels and gain matching of the individual amplifiers in each sub-channel is therefore not required. For example, if the gain of two of the sub-channels varies by plus or minus twenty percent about the mean sub-channel gain the resultant misalignment of the output member 4 is less than one percent of the total travel of the output member 4.

If a failure occurs in one of the sub-channels the system is still able to operate satisfactorily. The worst failure case is one in which a fault causes one of the servo motors 1, 2, 3 to run away to one limit of its travel. The remaining two servo motors have a total authority of up to twice the total movement of the output member 4 and are therefore able to accommodate the error and still retain 100% authority to enable the system to continue to function wihout introducing a large error. For example, in a typical system in which each sub-channel has an outer loop gain of ten the resultant error caused by run away of one of the servo motors is less than four percent of maximum output travel.

Although in the event of a failure in one sub-channel the system is able to continue to operate with 100% authority it is sometimes desirable that the occurrence of a failure should be indicated. Since the output of the three servo motors 1, 2, 3 are independent, simple output displacement monitoring may be used to indicate the occurrence of a failure and in the present example this is achieved by the comparator 14 which compares the amplitudes of the signals fed back to the servo amplifiers 5, 6, 7 these signals, of course, being proportional to the output displacement of the servo motors 1, 2, 3. Any discrepancy between any one signal and the other two causes an output from the comparator 14 which is used to indicate in which sub-channel the failure has occurred and which may also be used to disconnect the inputs to the faulty sub-channel if this is desirable.

In the system described above the use of increased sub-channel gains causes a reduction in the resultant errors in the event of a failure occurring in one sub-channel. The use of increased gains, however, has the disadvantages that as the gain is increased the system stability margin is correspondingly reduced. In the extreme case of loss of feedback along one of the paths 11, 12, 13 the overall gain of the system is increased by a factor $$\frac{2+n}{3}$$

where $n$ is the ratio of the increased loop gain to the nominal loop gain. If, for example, the open loop gain in a faulty sub-channel is ten, the system gain is increased by a factor $$\frac{2+10}{3}=4$$

and such a large gain increase may cause instability. FIGURE 2 shows a modification of the system shown in FIGURE 1 by means of which this disadvantage is avoided.

Referring now to FIGURE 2, the system shown is similar to that shown in FIGURE 1 and like parts have been given like reference numerals. In this system, however, duplexed feedback paths 11A, 11B, 12A, 12B, 13A, 13B are provided between the servo motors 1, 2, 3 and the servo amplifiers 5, 6, 7, the comparator 14 being connected to the paths 11B, 12B, 13B. Similarly, duplexed pick-off devices 15A, 15B, 16A, 16B, 17A, 17B, shown schematically as potentiometers, are provided for detecting movements of the output member 4 such that the negative feedback to the signal amplifiers 8, 9, 10 is also duplexed.

In this system, in the event of a failure in one of the feedback paths 11A, 11B, 12A, 12B, 13A, 13B the sub-channel loop gain of the faulty sub-channel can only be increased by a factor of two and the system gain is increased by a factor $$\frac{2+2}{3}=\frac{4}{3}$$

The system gain is therefore only increased by a maximum of one-third and such a gain increase does not greatly affect the stability of the system.

It is only necessary for the comparator 14 to be connected to one of the duplexed feedback paths in each sub-channel since a fault in either of the two feedback paths in any one sub-channel will cause a variation in the feedback in the other path in that sub-channel. For example, if there is a loss of signal in the feedback path 11B the comparator 14 will give an output to indicate that this sub-channel is at fault. Also, if there is a loss of signal in the feedback path 11A there will be an increase in the amplitude of the feedback signal in the path 11B and the comparator will again give an output to indicate that this sub-channel is at fault.

Loss of feedback to any one of the signal amplifiers 8, 9, 10 results in an increase in the system closed loop gain for small input signals. By duplexing the feedback applied to the signal amplifiers 8, 9, 10 as shown in FIGURE 2 this increase is also restricted.

Although in the systems described above the output member 4 has been moved in a straight line manner the invention is also applicable to multiplex systems in which a rotary output is required, the rotary output servo motors being mechanically connected in series through a differential device. One way in which such a series connection may be achieved is shown in FIGURE 3 which shows the three rotary output servo motors 21, 22, 23 of a triplex servo system. The casing of the motor 21 is fixed and the output shaft of the motor 21 is provided with a gear wheel 24 which engages a gear wheel 25 secured to the casing of the motor 22. Similarly, the output shaft of the motor 22 is provided with a gear wheel 26 which engages a gear wheel 27 secured to the casing of the motor 23. The output shaft of the motor 23 is the system output shafts.

The servo motors 21, 22, 23 are controlled through three separate sub-channels (not shown) in the same manner as the servo motors 1, 2, 3 described with reference to FIGURES 1 and 2 and the system operates in the same manner as the straight line system described with reference to FIGURES 1 and 2.

The systems described above may be modified in many ways. For example, the electrical comparator 14 may be replaced by a mechanical comparator for comparing the output displacements of the servo motors 1, 2, 3. Also, it is sometimes desirable that in the event of a failure in one of the sub-channels the system should continue to operate with reduced authority and in such cases each of the servo motors 1, 2, 3 may be limited to less than full authority. Furthermore, although the invention has been described with reference to a triplex servo system, the invention is also applicable to duplex servo systems or to quadruplex or higher order servo systems. In triplex and higher order systems the system will continue to operate with 100% authority if each servo motor has an authority not less than $$\frac{1}{N-2}$$

where N is the number of channels in the system.

What we claim is:

1. A multiplex servo system including a plurality of servo motors mechanically connected in series for driving an output member, an individual sub-channel connected to each servo motor for controlling the associated servo motor, each individual sub-channel having at least one amplifier, a plurality of pick-off devices for detecting movements of the output member and each sub-channel including a negative feedback path connected from the associated servo motor for applying to said sub-channel a feedback signal proportional to the output displacement of the associated servo motor and a negative feedback path connected from an individual pick-off device responsive to total movement of said output member for applying to said sub-channel a feedback signal proportional to the total movement of the output member.

2. A multiplex servo system as claimed in claim 1 in which each of said sub-channels includes a servo amplifier and a signal amplifier.

3. A multiplex servo system as claimed in claim 2 in which the negative feedback path from the associated servo motor in each sub-channel is connected to the servo amplifier of the channel and the negative feedback path from said individual pick-off device is connected to the signal amplifier of that channel.

4. A multiplex servo system as claimed in claim 1 in which the negative feedback path from each servo motor is multiplexed.

5. A multiplex servo system as claimed in claim 1 in which said individual pick-off devices and the negative feedback paths therefrom are multiplexed.

6. A multiplex servo system as claimed in claim 1 including a comparison device for comparing the output displacements of each of said servo motors.

7. A multiplex servo system as claimed in claim 6 in which said comparison device is adapted to compare the signals in a negative feedback path from each servo motor.

8. A triplex servo system including three servo motors mechanically connected in series for driving an output member, an individual sub-channel connected to each of said servo motors for controlling the associated servo motor, a plurality of pick-up devices for detecting movements of the output member and each sub-channel having a servo amplifier, a signal amplifier, a negative feedback path connected from the associated servo motor to said servo amplifier for applying to said servo amplifier a feedback signal proportional to the outut displacement of the associated servo motor and a negative feedback path connected from an individual pick-off device responsive to total movement of said output member to said signal amplifier for applying to said signal amplifier a feedback signal proportional to the total movement of the output member.

References Cited by the Examiner

UNITED STATES PATENTS

| | | | |
|---|---|---|---|
| 2,686,285 | 8/1954 | Meredith et al. | 218—489 X |
| 3,054,039 | 9/1962 | Meredith | 218—19 X |
| 3,070,071 | 12/1962 | Cooper | 318—19 X |
| 3,136,698 | 6/1964 | Mann | 318—19 X |
| 3,156,855 | 11/1964 | Righton et al. | 318—19 |

ORIS L. RADER, *Primary Examiner.*

B. DOBECK, *Assistant Examiner.*